(12) United States Patent
Pohjola

(10) Patent No.: US 10,289,128 B2
(45) Date of Patent: May 14, 2019

(54) METHOD AND ARRANGEMENT FOR MAINTAINING FLUID FLOW PRESSURE IN A SYSTEM AT A PRESET, ALMOST CONSTANT LEVEL

(71) Applicant: SOLAR WATER SOLUTIONS OY, Espoo (FI)

(72) Inventor: Heikki Antero Pohjola, Helsinki (FI)

(73) Assignee: Solar Water Solutions OY, Espoo (FI)

( * ) Notice: Subject to any disclaimer, the term of this patent is extended or adjusted under 35 U.S.C. 154(b) by 120 days.

(21) Appl. No.: 15/118,781

(22) PCT Filed: Feb. 18, 2015

(86) PCT No.: PCT/FI2015/050096
§ 371 (c)(1),
(2) Date: Aug. 12, 2016

(87) PCT Pub. No.: WO2015/124833
PCT Pub. Date: Aug. 27, 2015

(65) Prior Publication Data
US 2017/0045898 A1    Feb. 16, 2017

(30) Foreign Application Priority Data
Feb. 19, 2014    (FI) ..................................... 20140049

(51) Int. Cl.
*B05B 1/32*    (2006.01)
*F16K 1/38*    (2006.01)
(Continued)

(52) U.S. Cl.
CPC .............. *G05D 16/16* (2013.01); *B05B 1/32* (2013.01); *F03B 1/04* (2013.01); *F16K 1/385* (2013.01);
(Continued)

(58) Field of Classification Search
CPC ... B05B 1/32; B05B 1/323; F03B 1/04; F16K 1/38; F16K 1/385; F16K 17/04;
(Continued)

(56) References Cited

U.S. PATENT DOCUMENTS

| 697,680 | A | * | 4/1902 | Singer | ................... F16K 17/085 |
|---|---|---|---|---|---|
| | | | | | 137/505.22 |
| 2,557,423 | A | * | 6/1951 | Fulpius | ..................... F03B 1/04 |
| | | | | | 239/583 |

(Continued)

FOREIGN PATENT DOCUMENTS

| CN | 1148882 | 4/1997 |
|---|---|---|
| CN | 102900871 | 1/2013 |

(Continued)

OTHER PUBLICATIONS

International Search Report for PCT/FI2015/050096, Completed by the Finnish Patent Office dated Apr. 20, 2015 4 Pages.
(Continued)

*Primary Examiner* — Eric Keasel
*Assistant Examiner* — Richard K. Durden
(74) *Attorney, Agent, or Firm* — Brooks Kushman P.C.

(57) ABSTRACT

A method and arrangement for maintaining fluid flow pressure in a system at a preset, almost constant level. A method for maintaining fluid flow pressure almost constant regardless of mass flow. The arrangement including a pressure accumulator, and a nozzle valve. The nozzle valve having a valve body and axially oriented needle for opening and closing the mouth of its outflow channel. The needle shaft guided by a slide element mounted inside the valve body. The inflow into the flow body passes to the other side of the slide element through one or several channels. The needle moves axially to open and close the channel because of the forces acting upon it. Forces acting upon it may include the
(Continued)

accumulator, the inflow and a spring. The needle's movement adjust the cross-sectional area of the outflow channel mouth not disposed by the needle head to maintain an almost constant pressure.

11 Claims, 3 Drawing Sheets

(51) Int. Cl.
    *G05D 16/16*     (2006.01)
    *F16K 31/126*     (2006.01)
    *F03B 1/04*     (2006.01)
    *F16K 17/04*     (2006.01)
    *G05D 16/06*     (2006.01)

(52) U.S. Cl.
    CPC .......... *F16K 17/04* (2013.01); *F16K 31/1266* (2013.01); *B01D 2311/14* (2013.01); *G05D 16/063* (2013.01); *G05D 16/0644* (2013.01); *Y02E 10/223* (2013.01); *Y02E 10/38* (2013.01); *Y10T 137/0357* (2015.04); *Y10T 137/0396* (2015.04); *Y10T 137/7836* (2015.04)

(58) Field of Classification Search
    CPC .. F16K 31/1266; G05D 16/02; G05D 16/063; G05D 16/0644; G05D 16/08; G05D 16/16; G05D 16/163; Y02E 10/38; Y10T 137/0357; Y10T 137/0396; Y10T 137/7796; Y10T 137/7836
    USPC ........... 210/137, 257.2, 637, 652; 137/8, 14, 137/505.13, 510
    See application file for complete search history.

(56) References Cited

U.S. PATENT DOCUMENTS

| | | |
|---|---|---|
| 3,399,543 A | 9/1968 | Matthies |
| 4,177,926 A | 12/1979 | Hunter |
| 5,515,884 A | 5/1996 | Danzy et al. |
| 5,832,944 A | 11/1998 | Lindner |
| 5,918,628 A | 7/1999 | Harding |
| 6,050,292 A * | 4/2000 | Richman ............. F16K 31/1266 137/495 |
| 6,131,606 A | 10/2000 | O'Neill |
| 6,485,258 B1 | 11/2002 | Steinborn |
| 9,377,115 B2 | 6/2016 | Frick et al. |
| 2004/0237548 A1 | 12/2004 | Ben Yahia |
| 2011/0005250 A1 | 1/2011 | Perz |
| 2011/0006005 A1 | 1/2011 | Thomson et al. |

FOREIGN PATENT DOCUMENTS

| | | |
|---|---|---|
| CN | 103080620 | 5/2013 |
| DE | 1044496 | 11/1958 |
| EP | 2568203 | 3/2013 |
| GB | 2260595 | 4/1993 |
| JP | S53134137 A | 11/1978 |
| JP | 2004354042 A | 12/2004 |
| JP | 2011017440 | 1/2011 |
| WO | 9813633 | 4/1998 |
| WO | 03104910 | 12/2003 |
| WO | 2004099658 | 11/2004 |

OTHER PUBLICATIONS

Chinese Office Action with English Translation for Chinese Application No. CN 201580008909.4, Completed by the Chinese Patent Office, dated Jan. 30, 2018, 8 Pages.

Extended European Search Report for European Application No. EP 15751468.8, Completed by the European Patent Office, dated Sep. 22, 2017, 5 Pages.

English Bibliographic Data and Abstract to Chilean Reference CL200502755, Pucliation Date Dec. 22, 2006, 9 Pages.

Chilean Search Report for Application No. 201602057, Google Machine Translation of First page of Chilean Search Report dated Mar. 13, 2018, All together 12 Pages.

JP Notice of Refusal dated Jan. 8, 2019, 6 pages including machine translation.

* cited by examiner

PRIOR ART

METHOD AND ARRANGEMENT FOR MAINTAINING FLUID FLOW PRESSURE IN A SYSTEM AT A PRESET, ALMOST CONSTANT LEVEL

CROSS-REFERENCE TO RELATED APPLICATION

This application is the U.S. national phase of PCT Application No. PCT/FI2015/050096 filed on Feb. 18, 2015, which claims priority to FI Patent Application No. 20140049 filed on Feb. 19, 2014, the disclosures of which are incorporated in their entirety by reference herein.

BACKGROUND OF THE INVENTION

This invention relates to a method for maintaining fluid flow pressure in a system at a preset, almost constant level, not depending on periodical variation of the mass flow pumped into it.

The invention relates also to an arrangement applying the method, typical features of which are maintaining fluid flow pressure in a system at a preset level.

BRIEF SUMMARY OF THE INVENTION

A nozzle valve, as a part of the arrangement which applies the invention, converts the flow into a high pressure jet, which is directed to impulse turbine buckets. The invention is especially suitable for use with wave power and reverse osmosis systems.

Publication WO 2004099658 A1 relates to a turbine nozzle valve, the opening of which is regulated by an electric gear motor and its quick closure is achieved by use of a pressure accumulator.

U.S. Pat. No. 5,832,944 and publication WO 9813633 A1 relate to a turbine nozzle valve, the opening of which is regulated with an electric gear motor. In the latter quick closure of the valve is carried out by use of a pressure accumulator.

DETAILED DESCRIPTION OF THE INVENTION

Figure 1A:
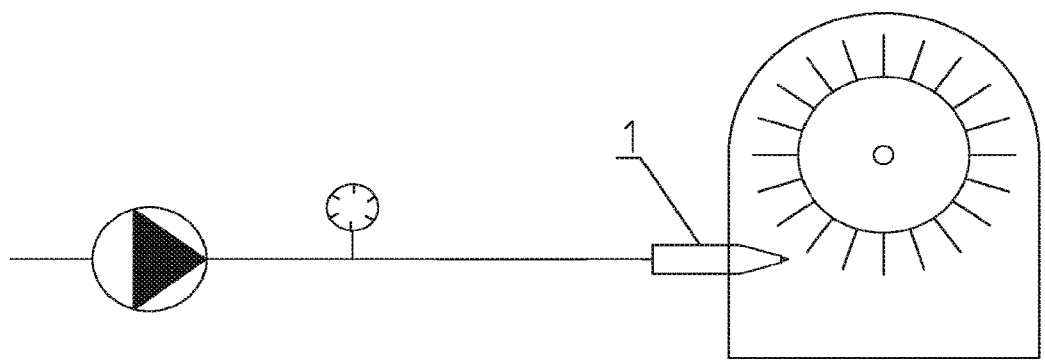
FIG. 1a shows an impulse turbine nozzle valve, which directs a jet to the turbine buckets.

It is well known that water can be pumped by use of wave power. The pumped mass flow varies occasionally, depending on the wind conditions. In contrast to the conventional water power plants, water which is pumped with wave power does not have potential energy and the resulting constant pressure. For this reason, the flow pressure must be specifically arranged. A typical solution is a throttle valve installed at the system's outflow, causing pressure to rise. Such a valve can be an impulse turbine nozzle valve, which directs a jet to the turbine buckets. FIG. 1a.

Figure 2A:
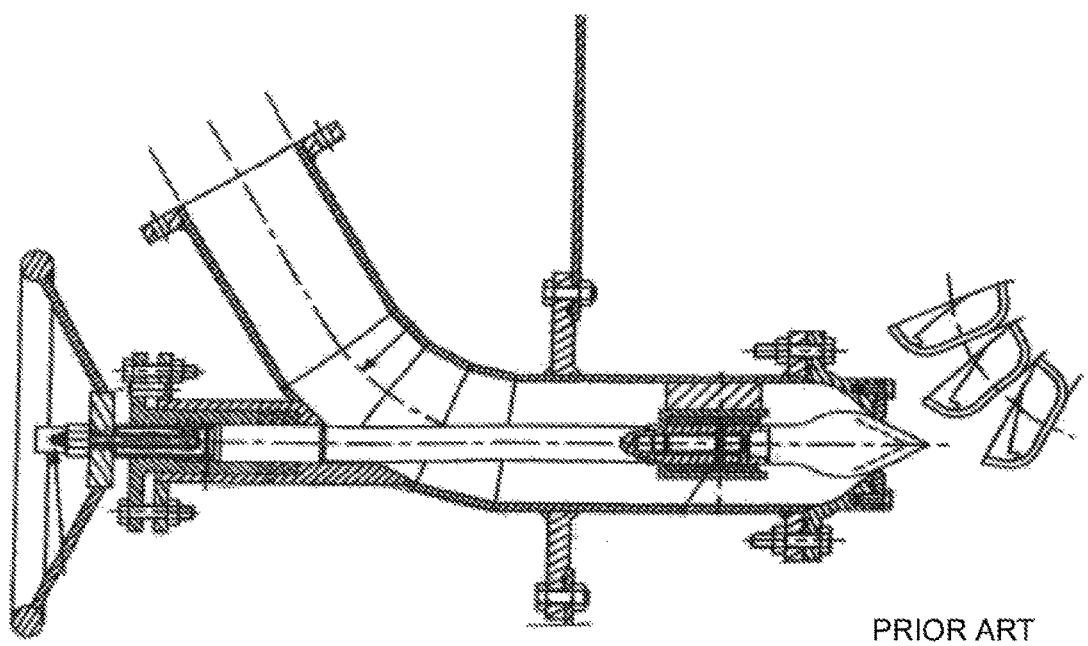
FIG. 2a shows a prior known nozzle valve, which resembles the invention and is used with a Pelton turbine. The valve can be used in small power plants and adjusted with hand operated mechanisms.
Figure 2B:
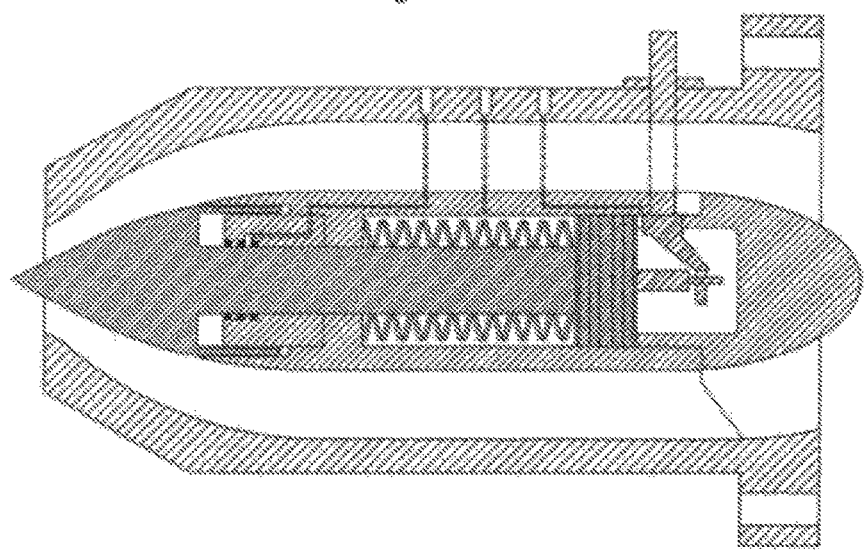
FIG. 2b shows another prior known nozzle valve, which resembles the invention and can be used with a Pelton turbine. The valve can be used in the bigger, over 100 kW systems, by governor mechanisms, in which the needle movement is achieved with servo motor pressurized oil.

An earlier known nozzle valve, which resembles the invention and is used with a Pelton turbine, is described in the figures FIG. 2a and FIG. 2b. These valves are used when the flow pressure derives from the height difference between water levels, in which case hydrostatic pressure remains constant and does not depend on the amount of mass flow streaming through the nozzle. Cross-sectional area of the nozzle mouth can be adjusted by moving a conical needle in it and due to this the mass flow through it varies, but the jet speed remains unchanged due to the constant pressure. Speed of the jet is:

$v = C_v \cdot \sqrt{(2gH)}$, where H (head) is the height of the water penstock (m), $C_v$ is the nozzle coefficient $\approx 0,98$. This equation means that the jet's velocity depends only on the pressure, which on its behalf depends on the penstock height.

In small power plants the needle is usually adjusted with hand operated mechanisms, FIG. 2a, and in the bigger, over 100 kW systems, by governor mechanisms, in which the needle movement is achieved with servo motor pressurized oil, FIG. 2b. The purpose of these mechanisms is to regulate the mass flow into the nozzle so that the flow corresponds to the turbine load. Kinetic energy of the jet $E_v = (mv^2)/2$ is varying according to the mass flow variations and the turbine power will change accordingly. The jet velocity depends only on the pressure caused by the water head.

It is obvious that it does not make sense to produce energy with water, which has been pressurized with electric or diesel pumps. This is why the valves mentioned above have been intended to operate with turbines in the power plants, where water has potential energy. They are not intended and not suitable when the nozzle valve itself must maintain the pressure constant in a system, into which pumped mass flow is occasionally varying.

In contrast to the valves mentioned above, the operating principle of the nozzle valve according to the invention is to maintain the system pressure constant, independent of the mass flow variations. Preferred uses of it are to utilize the amount of energy, which the water which is pumped by wave energy and also the reverse osmosis reject contain.

The jet velocity remains constant if water pressure remains constant. For example 50 bar pressure in the equation above corresponds to a 500 meter high water penstock.

Because the jet speed depends only on the pressure, so when the pressure remains constant the turbine power $P_{max} = \dot{m} \cdot p$, where m is the mass flow and p pressure, changes in direct proportion to the mass flow change. It is clear that if both the mass flow and pressure simultaneously drop, as the case is with a constant mouth nozzle, then the power drops drastically.

Figure 1B:
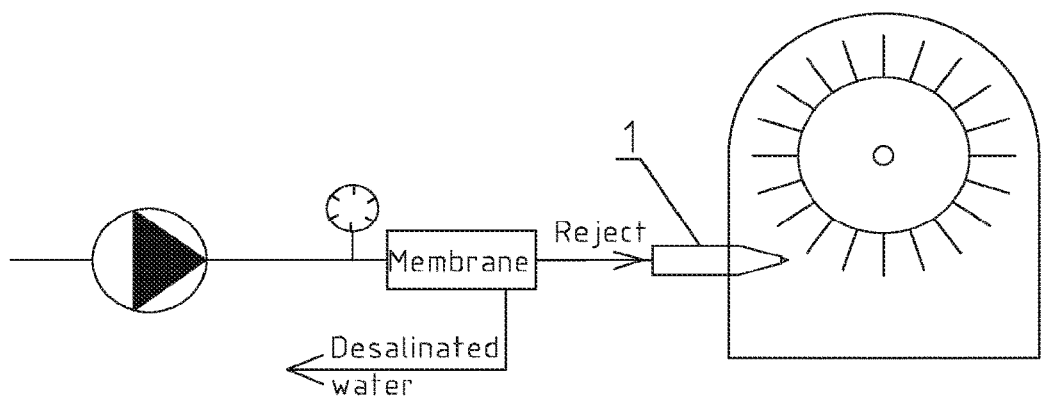
FIG. 1b shows a reverse osmosis system, in which the throttling device is installed on the reject tube. Reject is the salt concentrate, which outflows from the module and the flow throttling nozzle forms a jet, directing it to the turbine.

Simultaneous variation of the flow volume and pressure is problematic also as to the operation of a reverse osmosis system, because the salt-water pressure in the reverse osmosis modules must be higher than the osmotic pressure of the water, which in case of sea water is over 36 bar. The constant throttling commonly used in these systems is only applicable when the pumped inflow is constant. However, with wave energy that never is the case. In a reverse osmosis system, the throttling device is installed on the reject tube. Reject is the salt concentrate, which outflows from the module and the flow throttling nozzle forms a jet, directing it to the turbine, FIG. 1b.

Reject, which is outflowing from the reverse osmosis module, can contain 70-90% of the initial pumping energy.

The device which throttles and maintains the reverse osmosis flow pressure can for example be a pressure relief valve. However, an essential problem is that after the throttle the energy which the reject has contained is lost and cannot be utilized in the turbine. Opening pressure in a mechanically operating pressure relief valve is about double to its closing pressure, which creates a problem in reverse osmosis systems.

For the reasons described above, it is essential that pressure in the flow throttling valve remains constant also in cases when the inflow is occasionally varying.

The purpose of the invention is to create a method and arrangement in which a nozzle valve maintains fluid flow pressure in a system at a preset level and almost constant level, not depending on periodical variations of the mass flow pumped into it. The same nozzle valve converts the flow into a high pressure jet directing it for example to impulse turbine buckets.

This purpose is achieved with the method according to the invention characterized in the method and the arrangement according to the invention.

The invention is especially well suited for maintaining the pressure of a reverse osmosis system and for utilizing a reject pressure of the reverse osmosis system by using a Pelton turbine. In this manner, the production of sweet water and the reject-force-operated impulse turbine can be operated at an optimal efficiency. The method and arrangement according to the invention are described in more detail in the following with reference to the figures FIG. 1a, FIG. 3a, and FIG. 3b.

The nozzle valve 1 comprises a hollow and long, preferably cylindrical body 2, which can be assembled of several parts and at the other end of which, in direction of the body 2 axis is a nozzle channel 8, which is preferably conical, having a circular cross-section and through which the outflow is arranged. Inflow into the body 2 happens through a channel 3 in the body wall.

For sake of clarity that end of the body 2 where the channel 8 is situated is referred hereinafter to the lower part of the body 2.

The channel 8 is opened and closed with a reciprocating movement of the needle 4 inside the body 2. The needle is formed of an essentially cylindrical shaft and conical head, which opens and closes gradually the channel 8 by changing its cross-sectional flow area when moving in it.

Figure 3A:
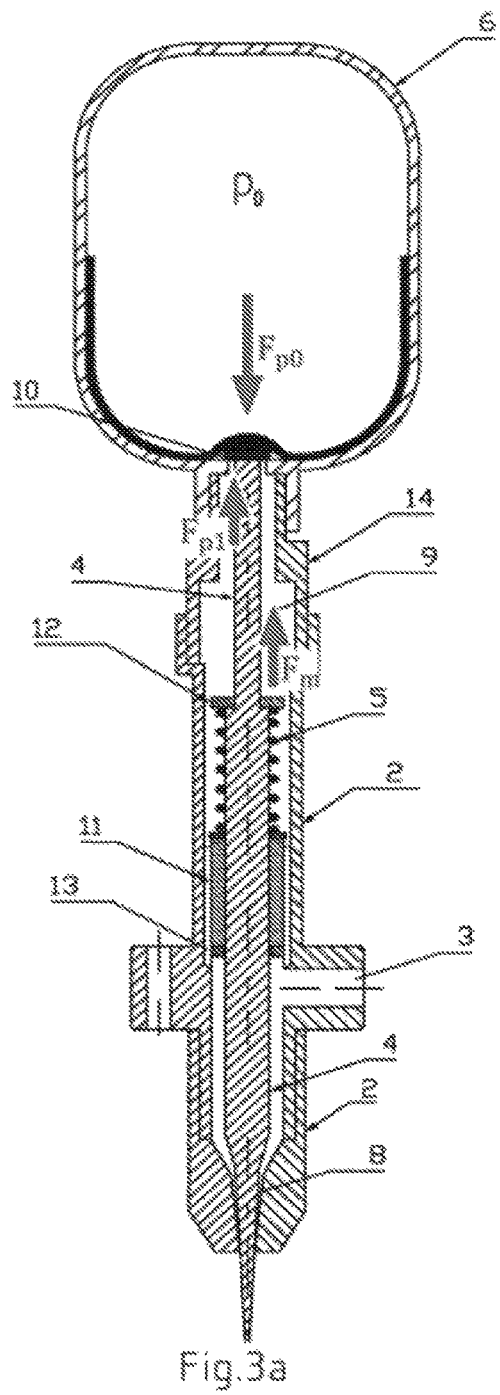
FIG. 3a shows cross section of one embodiment of the nozzle valve construction according to the present invention. The valve is in closed position.
Figure 3B:
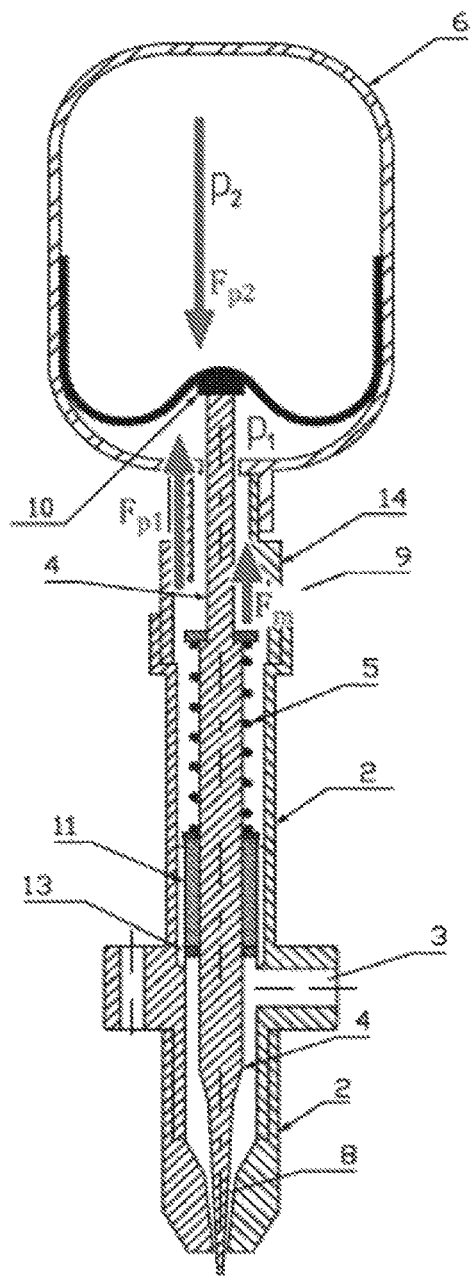
FIG. 3b shows the same as FIG. 3a but the valve channel is opened due to inflowing stream.

When the channel 8 is closed, the needle 4 head has a small clearance to the channel 8 mouth. When the channel 8 is closed it does not have to be totally sealed, it is enough that the flow through it is essentially blocked. The upper end of the body 2, which is opposite to the channel 8, has a pressure accumulator 6 joined to it, directly or with an intermediate tube 14, in such a way that the inflow into the block 2 can also get beneath the valve disc 10 of the accumulator 6 through the channel 9, which is formed between the body 2 and accumulator 6 and the needle 4 can move in the channel 9 axially reciprocating. A slide element 11 is mounted inside the body 2 to guide the needle 4 shaft. Outside the slide element 11 there are grooves or channels 13 in the body 2 wall through a inflowing stream can pass to the other side of the slide element 11 and proceed to the channel 9 and consequently beneath the valve disc 10, which closes the pre-pressurized accumulator 6. FIG. 3b. It is also possible that the groove or channel 13 is in the needle 4 shaft.

At the beginning, when there is no flow, the needle 4 head closes the channel 8 and the needle 4 is then at its lowest position and the disc 10 is supported by the accumulator 6 body. FIG. 3a. In this situation the needle 4 shaft end is pressed against the disc 10 by means of a compression spring 5. The spring 5 is tensioned and has its lower end essentially supported by the slide element 11 or the body 2 and its upper end by a plate 12 mounted on the needle 4 shaft or by a widening at the shaft.

When a hydraulic pump begins to pump inflow into the system, the flow pressure rises in the body 2 because the flow is not able to go out through the channel 8 while the needle 4 is closing it. Nor can the needle 4 move because its upper end, by means of the spring 5, is compressed against the valve disc 10, which closes the accumulator 6. For this reason, the flow pressure increases until it exceeds into the accumulator 6 pre-pressurized pressure p0 and then the disc 10 begins to rise because of the lifting force affecting it. This lifting force is the sum of the spring force Fs and the force which the flow pressure p1 causes on the needle 4. The spring force holds the needle 4 shaft end all the time essentially touching the disc 10. Because the pressure p1 is high, it is possible that it can enter between the needle shaft end and the disc 10. In that case the pressure p1 would try to press the needle downwards and because of this the spring force must in all situations be greater than this downwards pressing force.

As the conical needle 4 head rises with the disc 10, the outflow channel 8 opens and its cross-sectional flow area correspondingly increases. FIG. 3b. Channel 8 opens just that much that the flow volume through it corresponds the pressure p2. Gas pressure p2 in the diaphragm pressure accumulator 6 and the inflow pressure p1 in the valve 1 are essentially equal in all operational flow situations.

The greater gas volume the accumulator 6 has, the smaller is the difference between p2 and into the accumulator 6 pre-pressurized pressure p0. This is because the relative gas volume change in the accumulator 6, due to the needle 4 rise, remains minor. The maximum operational volume change should be less than 16%, advantageously less than 9% of the accumulator's volume at the point of reaching operational pressure level of the accumulator.

Ratio of maximum operating pressure p2 to gas precharge pressure p0 can never be higher than accumulator's design pressure ratio given by manufacturer, normally 4:1

Pressure rise from p0 to p2 in the accumulator (6) is inversely proportional to its gas volume change due to the needle (4) rise. The maximal operational pressure p2 can be selected at a desired level by selection of p0, accumulator volume, cone angle of the needle (4) head and cross-section of the channel (8) mouth according to the maximal operational flow volume.

Advantageous operational pressure ratio due to the needle (4) rise: p2/p0<1.1.

This way the flow pressure p1 remains almost constant even though the flow volume occasionally varies, and as a result of this pressure in the whole system also remains essentially constant. When the inflow ceases, the valve 1 maintains the system pressure at level p0. However, it is beneficial to a reverse osmosis module that no highly concentrated salt water stays in it as such the channel 8 can be left slightly open. When used with a reverse osmosis system the initial pressure p0 in the accumulator 6 is chosen higher than osmotic pressure of the saline water to be treated. Pressure p0 is set essentially to the level at which the operational pressure in the whole system is desired to be and at which the jet, provided by the valve 1, begins.

The spring 5 force is defined according to the circular cross-section area of the outflow channel 8 mouth, pre-pressurized initial gas pressure p0 in the accumulator 6 and the maximal operational movement of the needle 4. The spring force Fs must be the greater one in following equations:

a) Fs=p2·A7, when needle 4 is at its highest operational position b) Fs=p0·A 7, when needle 4 is closing the channel 8.

A7 is the cross-sectional area of the conical needle 4 head just at the channel 8 mouth, perpendicular to its longitudinal axis at the current operational moment. Because in practice the flow pressure p1 can enter between the needle 4 shaft end and the valve disc 10, the spring force lifting the needle must be greater than the force caused by pressure p1 which is pressing downward in order for the needle 4 to rise with the valve disc 10.

However, the needed spring force is relatively small and only a fraction compared to the spring forces of the conventional pressure relief valves. In the solution according to the invention the needle 4 movement is smooth and has low friction. In some embodiments it may have almost no friction. The needle moves quickly as a result of even the smallest change attempt of the pressure p1, thus maintaining it essentially constant.

The needle (4) moves according to the inflow changes because as the cross-sectional area of the channel 8 mouth stays constant, flow pressure p1 in the valve rises or drops. According to the invention, gas pressure p2 in the accumulator 6 begins to push the valve disc 10 and due to this the needle 4 downwards immediately when flow pressure p1 gets below the gas pressure p2 and correspondingly flow pressure p1 begins to lift the disc 10 and due to this the needle 4 immediately when it exceeds the gas pressure p2. As a result of this movement, clearance between the conical needle 4 head and channel 8 mouth changes as a function of the flow volume change and due to this the flow pressure remains essentially constant.

In this way system pressure and due to this velocity of the jet through the nozzle channel 8 remains essentially constant. When the flow stops the channel 8 gets closed because the pressure in the accumulator 6 pushes the disc 10 and the conical needle 4 head into their lowest position. The needle 4 head does not get stuck in the channel 8 because the disc 10 movement stops against the accumulator 6 body, causing also the needle 4 movement to stop.

An alternative arrangement in which the upper end of the needle 4 shaft is fixed to the valve disc 10, is also possible. In that case the spring 5 is not obligatory, even though advantageous. This kind of arrangement requires a special pressure accumulator, which so far is not in the market.

It is also possible that instead of the diaphragm accumulator 6, a bladder accumulator is utilized. However, as to the structure and operation, this would in practice be less favorable than a diaphragm accumulator.

The inflow volume could increase higher than designed for the system, for example during storm conditions, and due to this the system pressure would exceed its design value. This excessive flow and pressure rise can be avoided by use of another valve which operates with the same principle and is installed in the system before the valve 1 and is adjusted to open with a slightly higher pressure than the designed maxim pressure p2.

The invention claimed is:

1. A method for maintaining fluid flow pressure in a system at a preset level, the system including:
    a pressure accumulator comprising a valve disc wherein the pressure accumulator initially holds a pre-pressurized gas pressure (p0) and volume, and
    a nozzle valve having:
        a valve body with an inflow channel and an outflow channel, the outflow channel having a cross-sectional area opposite the accumulator, and a mouth with a diameter opposite the accumulator,
        a needle axially oriented inside the valve body, the needle having a shaft and a conical needle head for opening and closing the outflow channel, and
        a slide element mounted inside the valve body for guiding the needle shaft,
    wherein the nozzle valve provides a fluid inflow into the valve body which can pass the slide element when fluid flows through one or several channels to fill the valve body and the needle moves axially in directions for opening and closing the outflow channel thereby adjusting the cross-sectional area of the outflow channel around the needle head,
the method comprising the steps of:
    supplying the fluid inflow into the valve body wherein, the fluid inflow creates a pressure (p1) that exerts a force on the needle and a spring exerts another force on the needle, wherein the direction of a combined net force (Fm) from the fluid inflow pressure and the spring is towards the valve disc so that the combined net force (Fm) holds the needle shaft constantly pressed against the valve disc,
    forming a first force by the combined net force (Fm) in combination with a force (Fp1) exerted by the fluid inflow pressure (p1) on the valve disc, whereby the first force moves the valve disc and the needle opening the outflow channel against a second force (Fp0) in the opposite direction of the first force wherein, the second force (Fp0) is from the accumulator's gas pressure on the valve disc,
    whereby, the valve disc and the needle move toward the accumulator decreasing the volume and increasing the pressure of the accumulator from the pre-pressurized gas pressure (p0) to a second pressure (p2) when the first force exceeds the second force (Fp0), and
    selecting the diameter of the outflow channel mouth, an angle of the conical needle head and the volume of the pressure accumulator such that a gas volume variation in the pressure accumulator automatically adjusts the cross-sectional area of the outflow channel at the mouth that is around the needle head so that the fluid inflow pressure (p1) remains within a preset range as determined from the pre-pressurized gas pressure (p0) while the fluid inflow is sufficient to keep the outflow channel open.

2. The method according to the claim 1, wherein the pressure accumulator is a diaphragm accumulator or a bladder accumulator, the diaphragm accumulator or the bladder accumulator having a diaphragm with an inner side and an outer side and the diaphragm being connected to the valve disc wherein the inner side is affected by the pre-pressurized gas pressure (p0) and the outer side of the diaphragm is affected by the fluid inflow pressure (p1) such that the diaphragm and the needle fixed to the valve disc move as a result of the changes in the fluid inflow pressure (p1).

3. The method according to claim 1, wherein the pressure accumulator and nozzle valve are used for maintaining pressure in a reverse osmosis system comprising saline water having an osmotic pressure, wherein the pre-pressurized gas pressure (p0) in the accumulator is higher than the osmotic pressure of saline water.

4. The method of claim 1, wherein, the accumulator further comprises a design pressure ratio, wherein, the gas volume change in the accumulator is less than 16%, and the pressure change in the accumulator is less than the design pressure ratio.

5. The method of claim 1, wherein the gas volume change in the accumulator is less than 9% and the pressure change in the accumulator is less than 10%.

6. An arrangement for maintaining fluid flow pressure in a system at a preset level comprising:
   a pressure accumulator initially holding a pre-pressurized gas pressure (p0) and comprising a valve disc, in the form of a diaphragm accumulator or a bladder accumulator; and
   a nozzle valve comprising:
      a valve body having an outflow channel and the outflow channel having a mouth opposite the accumulator wherein the mouth has a cross-sectional area and a diameter,
      a needle with a conical needle head and a shaft axially oriented inside the valve body, for opening and closing the mouth of the outflow channel wherein, the conical needle head has a conical angle,
      a slide element mounted inside the valve body for guiding the needle shaft,
      one or more channels wherein, a fluid inflow into the valve body can pass the slide element when the fluid flows through the one or more channels to the pressure accumulator wherein, the pressure accumulator is connected to the valve body opposite the outflow channel,
      a pre-tensioned spring exerting a force (Fs) on the needle towards the accumulator wherein, the spring having a first end and a second end is supported at the first end by the valve body and at the second end by the needle shaft, whereby the force (Fs) holds the needle shaft against the valve disc of the pressure accumulator ensuring the needle and the valve disc move together;
   whereby, the needle is moveable along its axis in an opening direction and a closing direction in order to adjust the cross-sectional area of the outflow channel mouth around the conical needle head, and the needle having a length such that the conical needle head does not get stuck in the mouth of the outflow channel, thereby always allowing a small fluid leak,
   wherein, the pre-pressurized gas pressure (p0) in the pressure accumulator exerts a force (Fp0) on the valve disc and a force on the needle in the closing direction, whereby, the valve disc in a lowest position disposes the conical needle head in the mouth of the outflow channel closing the mouth of the outflow channel, and the spring force (Fs) with a force (Fp1) exerted by the fluid inflow on the valve disc move the valve disc and the needle against the force (Fp0) exerted by the pre-pressurized gas pressure (p0) in the accumulator opening the mouth of the outflow channel;
   wherein, when the valve disc moves in the opening direction, the pre-pressurized gas pressure (p0) in the pressure accumulator increases to a second pressure (p2) that corresponds to the movement of the valve disc;
   wherein, the diameter of the outflow channel mouth, the conical angle of the conical needle head and a gas volume in the pressure accumulator are such that the conical needle head adjusts the cross-sectional area of the outflow channel mouth around the conical needle head in a manner that a pressure (p1) of a fluid outflow, and a pressure in the whole system, remain within a range determined from the pre-set pre-pressurized gas pressure (p0) while fluid inflow is sufficient to keep the outflow channel mouth open.

7. The arrangement according to claim 6, wherein the shaft is fixed to the valve disc of the diaphragm or bladder accumulator.

8. The arrangement according to claim 6, wherein the accumulator and the nozzle valve are used for maintaining pressure in a reverse osmosis system having saline water and an osmotic pressure, wherein, the pre-pressurized gas pressure (p0) is chosen higher than the osmotic pressure.

9. The arrangement according to claim 6, wherein the pressure accumulator and nozzle valve are used to propel an impulse turbine.

10. The arrangement according to claim 6, wherein, the accumulator further comprises a design pressure ratio, wherein, the gas volume change in the accumulator is less than 16% and the pressure change in the accumulator is less than a design ratio.

11. The arrangement according to claim 6, wherein, the gas volume change in the accumulator is less than 9% and the pressure change in the accumulator is less than 10%.

* * * * *